United States Patent [19]

Tusji

[11] Patent Number: 4,974,066
[45] Date of Patent: Nov. 27, 1990

[54] CIRCUIT FOR PREVENTING HIGH-INTENSITY FALSE COLOR CAUSED BY COLOR SEPARATION FILTERS

[75] Inventor: Kiyoshi Tusji, Tanashi, Japan

[73] Assignee: Olympus Optical Co., Ltd., Tokyo, Japan

[21] Appl. No.: 315,770

[22] Filed: Feb. 27, 1989

[30] Foreign Application Priority Data

Apr. 14, 1988 [JP] Japan .................... 63-092205

[51] Int. Cl.$^5$ ............................. H04N 9/07
[52] U.S. Cl. ....................... 358/44; 358/47; 358/36
[58] Field of Search .............. 358/36, 43, 42, 44, 358/98, 47

[56] References Cited

U.S. PATENT DOCUMENTS

| | | | |
|---|---|---|---|
| 4,153,912 | 5/1979 | Gold | 358/44 |
| 4,480,266 | 10/1984 | Hashimoto | 358/43 |
| 4,593,313 | 6/1986 | Nagasaki et al. | 358/42 |
| 4,716,455 | 12/1987 | Ozawa et al. | 358/44 |
| 4,734,758 | 3/1988 | Honjo | 358/36 |
| 4,736,242 | 4/1988 | Takanashi et al. | 358/43 |
| 4,807,026 | 2/1989 | Nishioka et al. | 358/42 |
| 4,816,909 | 3/1989 | Kimura et al. | 358/42 |

FOREIGN PATENT DOCUMENTS 34793 9/1986 Japan .

Primary Examiner—John W. Shepperd
Attorney, Agent, or Firm—Armstrong, Nikaido, Marmelstein, Kubovcik & Murray

[57] ABSTRACT

A luminance signal and a color signal are separated from a color picture signal output from an imaging device with a plurality of color filters mounted thereon. The color filters are saturated at different intensity levels. This luminance signal is delayed to generate two delayed signals that respectively cover the front and rear edges of the color signal and a delayed signal that covers the interval between these edges. The color signal is suppressed by these delayed signals when the incident light has a high intensity, thereby preventing false color from occurring due to the incident light having a high intensity.

8 Claims, 11 Drawing Sheets

FIG.1 *(PRIOR ART)*
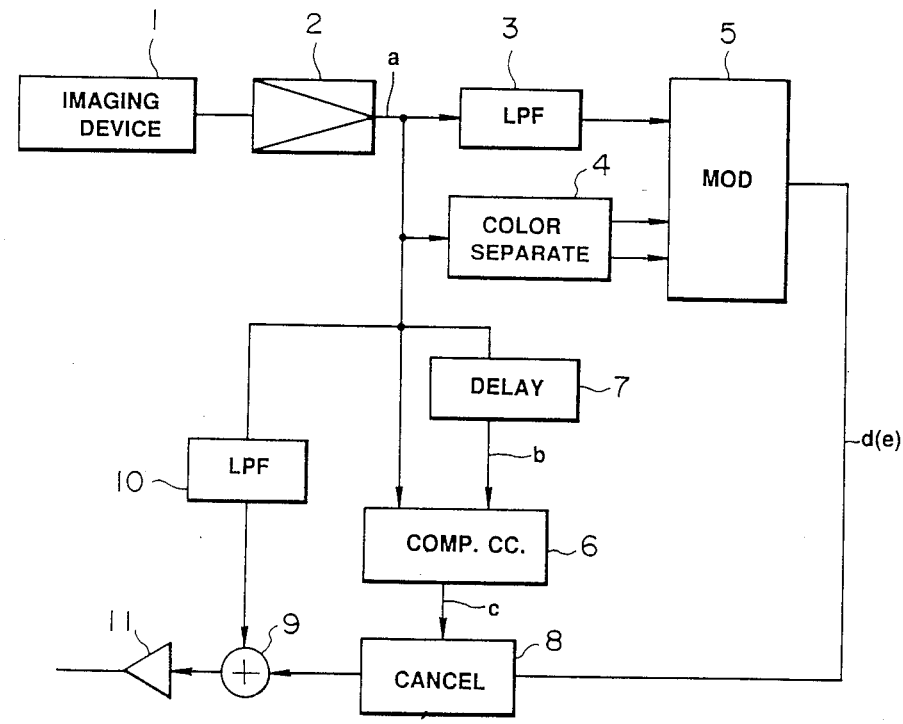
*(PRIOR ART)*
 FIG.2a ORIG. SIG. a
 FIG.2b DELAYED SIG. b
FIG.2c OUTPUT SIG. c OF COMP. 6
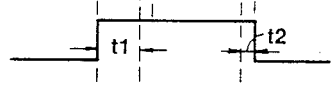 FIG.2d CHROM. SIG. d
 FIG.2e LUM. SIG. e

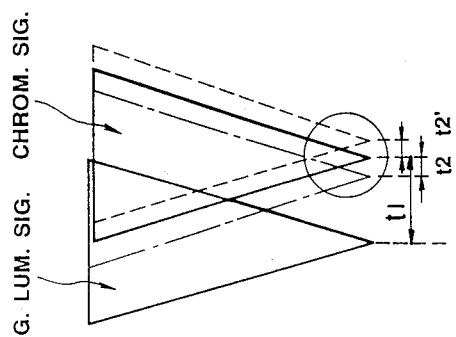
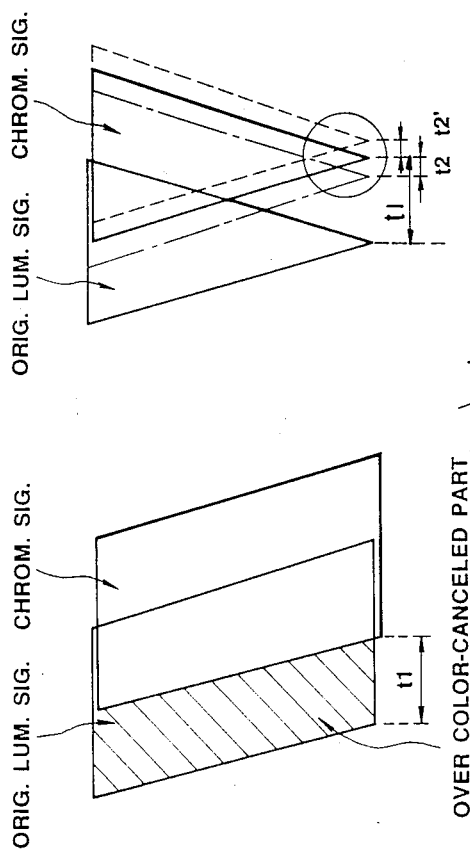
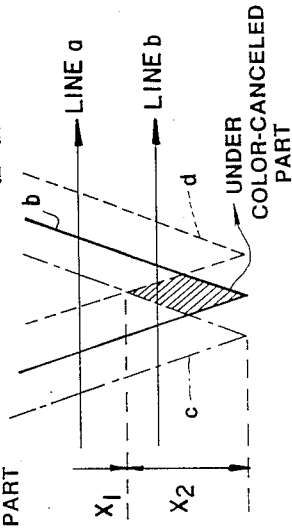

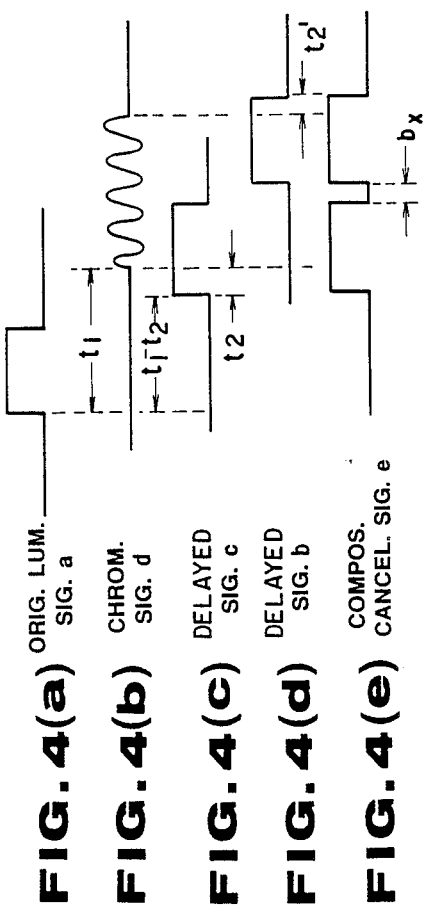
(PRIOR ART)

FIG.10
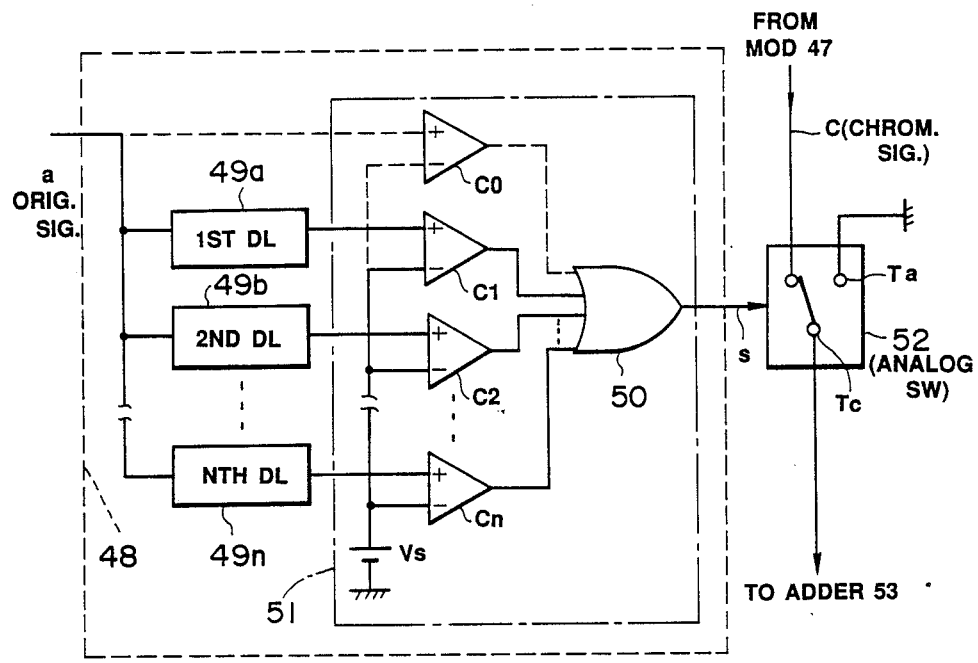
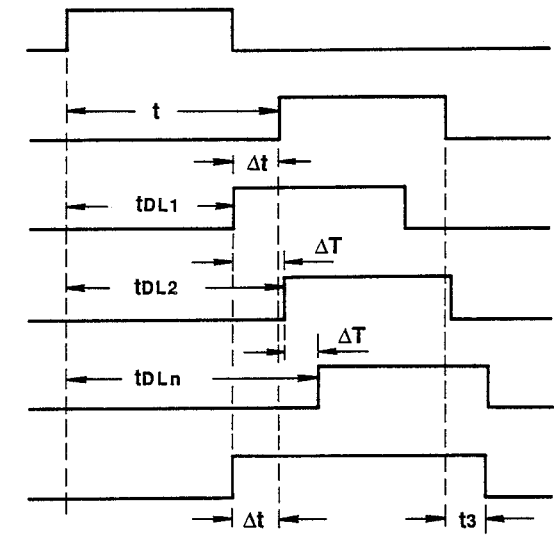
FIG.11a ORIGINAL SIGNAL a
FIG.11b CROMINANCE SIG. c
FIG.11c SIGNAL THROUGH 1ST DL 49a
FIG.11d SIGNAL THROUGH 2ND DL 49b
FIG.11e SIGNAL THROUGH nTH DL 49n
FIG.11f SUPRESSING SIGNAL

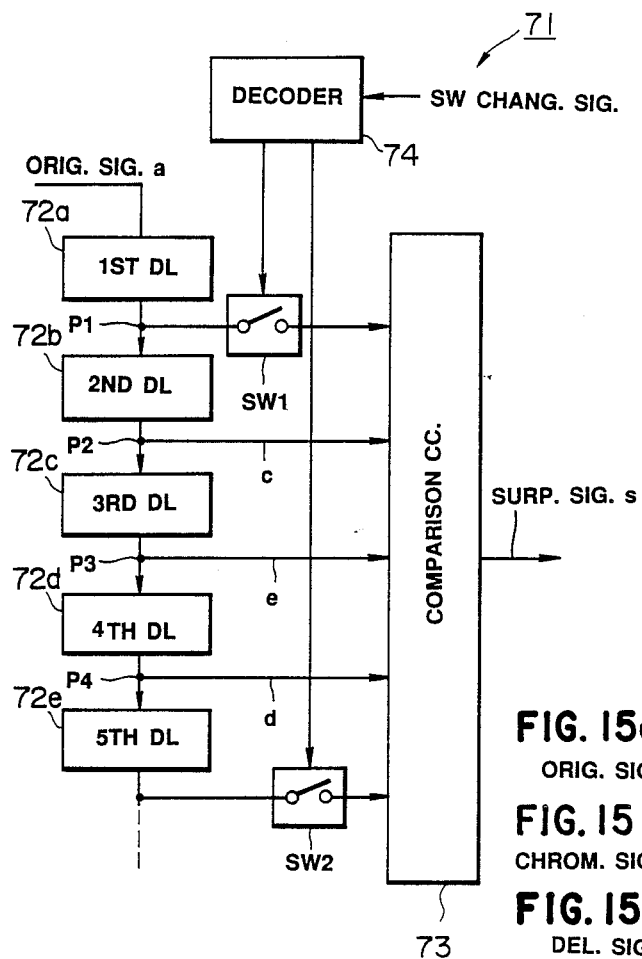

CIRCUIT FOR PREVENTING HIGH-INTENSITY FALSE COLOR CAUSED BY COLOR SEPARATION FILTERS

BACKGROUND OF THE INVENTION

1. Field of the Invention:

The present invention relates to a false color preventing circuit for preventing false color from occurring in a color picture signal which is obtained through a color separating filter due to the high intensity of incident light.

2. Description of the Related Art:

Single-tube or single-plate type color imaging devices generally produce R, G, and B video signals or Y, R, and B video signals. However, a false color signal is generated when the incident light has a high intensity, because the intensities of incident light at which light sensing elements are saturated differ due to the difference in the transmittance of the color filters provided in the imaging device.

It has therefore been proposed to cancel the false color signal generated in the high-intensity component using a luminance signal which is in phase with the false color signal. This method, however, suffers from a problem in that the false color is left uncancelled on the periphery of the cancelled portion due to (a) difference in the frequency characteristics between the luminance signal and the color signal, (b) slight phase difference between these signals or (c) flare. Accordingly, Japanese Utility Model Publication No. 61-34793 discloses a method of cancelling a false color signal using a cancelling signal having a larger width than that of a luminance signal which is in phase with the false color signal.

FIG. 1 shows a conceptual structure of such a conventional cancelling technique, and FIG. 2 is a timing chart of the operation of the conventional cancelling device.

In FIG. 1, the output signal of an imaging device 1 is amplified by an amplifier 2, and the output of the amplifier 2 is delivered to both of a low-pass filter 3 and a color separation circuit 4 which respectively produce a luminance signal and color-difference signals. The resultant luminance signal and color-difference signals are supplied to a modulator 5 to produce a chrominance signal. Further, the output signal of the amplifier 2 is input to a comparison circuit 6 and a delay circuit 7. The comparison circuit 6 compares the two signals and outputs a signal having a higher level. In other words, the comparison circuit 6 outputs an inclusive or signal of the two signals input.

The output of the comparison circuit 6 is used as a cancelling (suppressing) signal of a cancelling circuit 8 to which the chroma signal is input. The chroma signal which has passed through the cancelling circuit 8 is input to an adder 9 where it is added to the output signal of a low-pass filter 10, and the resultant signal is output through a buffer 11 as a color video signal.

Assuming that an original signal a which is output from the amplifier 2 is the one shown in FIG. 2a, the comparison circuit 6 produces a signal c shown in FIG. 2c from the signal a and a delayed signal b which has passed through the delay circuit 7.

The output signal of the amplifier 2 passes through the low-pass filter 3 and the color separation circuit 4, and is input to the modulator 5 which produces a chroma signal. FIG. 2d shows a portion d of the chroma signal in which a false color is generated. Assuming that a signal which is in phase with the chroma signal is represented by a signal e, the signal e is delayed from the original signal a by a time t1 because of the color processing including color separation and modulation.

The comparison circuit 6 produces a cancelling signal c having a width larger than that of the luminance signal e by a margin of t2 in the positive direction of the time base and by a margin of t1 in the negative direction. The saturation component of the false color portion in the chroma signal is cancelled using this cancelling signal in the cancelling circuit 8. The resultant signal is added to the luminance signal which has passed through the low-pass filter 10 in the adder 9, and the added signal is output through the buffer 11.

Although the delay time t1 required for a color signal to be processed differs depending on the circuit structure or the method employed, it is mainly caused by a band-pass filter. About 1 μs of delay time may occur at a maximum. This often makes the margin t1 of the cancelling signal produced in the conventional false color cancelling technique too wide relative to the false color signal, causing a normal color signal portion located at one side of the chroma signal containing false signal to be cancelled, as shown in FIG. 3.

In the case where the time duration of a high-intensity signal is very short, the ratio of the width of a false color signal to that of the high-intensity signal becomes very large, because, if an image sensor with a mosaic color filter, for example, is employed, a false color occurs at the front and rear edges of the luminance signal due to Moire caused by the color frequency of the filters.

It has therefore been considered to synchronize a cancelling signal having a large width from the original luminance signal such that it has minimum margins t2 and t2' at the two sides of the false signal. In FIG. 17, a delay 7' has a longer delay than delay 7. This technique is illustrated in FIG. 4 where output b of delay 7' corresponds to FIG. 4(c) and output c of delay 7 corresponds to FIG. 4(d). Reference symbols a and b in FIG. 4 respectively denote an original luminance signal and a chroma signal containing a false color. Signals c and d shown in FIGS. 4c and 4d are combined with each other to produce a cancelling signal shown in FIG. 4e. However, the resultant cancelling signal has no central portion, and is therefore insufficient to be used to cancel the false color. This failure caused by the cancelling signal is illustrated in FIG. 5. As is seen in FIG. 5, the closer to the apex of the triangle, the more the corresponding time length of the horizontal direction becomes shorted and the corresponding time length to draw line b is shorter than the time to draw line a. In this section $x_2$, the corresponding chroma signal period is shorter than the lag time between FIG 4(c) and FIG. 4(d). The waveform mixed in comparison circuit 6 of FIG. 17 is, as shown in FIG. 4(e), a pulse waveform in which no signals are generated in period $t_x$. This portion is the portion in which a corresponding cancelling pulse cannot be generated although a false color is generated.

SUMMARY OF THE INVENTION

An object of the present invention is to provide a false color preventing circuit which allows the cancellation of the normal portion of a color signal to be minimized, and which is capable of reliably preventing a false color.

Another object of the present invention is to provide a false color preventing circuit which is capable of faithful color reproduction.

To this end, the present invention provides a false color preventing circuit which includes a device for generating two delayed signals which cover the front and rear edges of a chroma signal generated by processing the output signal of an image sensor with a color filter, and a device for generating at least one delayed signal which covers the interval between the two delayed signals. In consequence, generation of the false color caused by the light having a high intensity can be prevented.

BRIEF DESCRIPTION OF THE DRAWINGS

FIG. 1 is a schematic view of a conventional false color preventing circuit;

FIGS. 2A–2E show the waveforms used to explain the operation of the conventional circuit of FIG. 1;

FIG. 3 schematically shows the faults of the operation of the circuit shown in FIG. 1;

FIGS. 4A–4E show the waveforms used to explain the operation of another conventional technique which is an improved type of the one shown in FIG. 1;

FIGS. 5A–5B schematically illustrate the faults of the operation of another conventional technique shown in FIGS. 4;

FIG. 10 is a block diagram of a suppressing signal generating portion;

FIGS. 11A–11F show the waveforms used to explain the operation of the first embodiment;

FIG. 14 is a block diagram of a suppressing signal generating portion, showing a third embodiment of the present invention;

FIGS. 15A–15F show the waveforms used to explain the operation of the third embodiment.

DETAILED DESCRIPTION OF THE PREFERRED EMBODIMENTS

Figure 6:
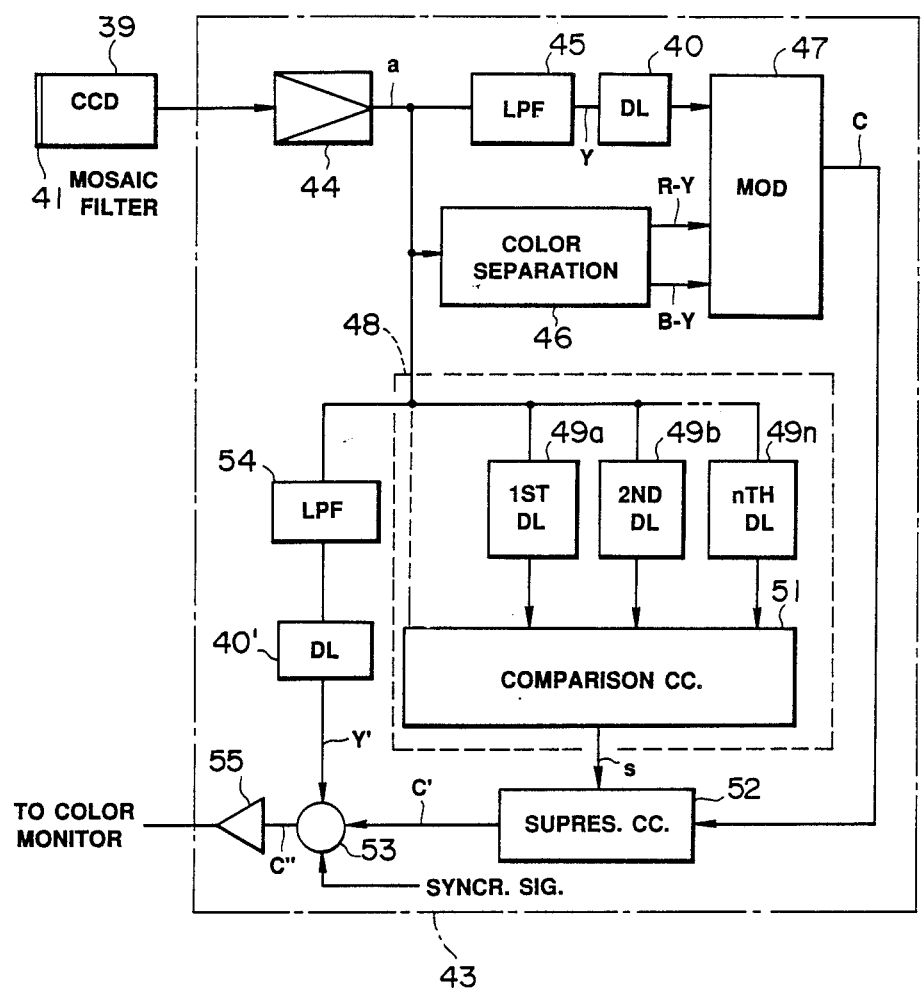
FIG. 6 is a block diagram of a false color preventing circuit, showing a first embodiment of the present invention.

A first embodiment of the present invention will be described below with reference to FIGS. 6 to 11. Referring first to FIG. 7, an endoscope 21 includes a fiberscope 22, a TV camera 24 mounted on an eyepiece portion 23 of the fiberscope 22, a light source unit 25 for supplying illumination light to the fiberscope 22, a signal processing device or a camera control unit (hereinafter referred to as a CCU) 26 for generating a color TV signal from signal produced by the TV camera 24, and a color monitor 27 for displaying the color TV signal output from the CCU 26.

The fiberscope 22 has an inserted portion 28 which is elongated so that it can be inserted into a body cavity. A light guide 29 for transmitting illumination light is inserted into the inserted portion 28. The light guide 29 is also passed through a light guide cable 32 extending from an operating portion 31, and is connected to the light source unit 25. The light source unit 25 includes a light source lamp 33, and a condenser lens 34 for condensing the white light illuminated from the light source lamp 33. The condensed light irradiates the incident end surface of the light guide 29.

The illumination light supplied to one end surface of the light guide 29 is transmitted to the other end surface of the light guide 29 so that it irradiates an object. An image of the object is formed on one end surface of an image guide 36 by an objective lens 35 provided at the forward end portion of the inserted portion 28. The image formed on one end surface of the image guide 36 is transmitted to the other end surface thereof. The optical image formed on the other end surface of the image guide 36 can be visually observed through an eyepiece 37 provided in the eyepiece portion 23. By mounting the TV camera 24 on this eyepiece portion 23, the optical image transmitted to the other end surface can be formed on a CCD 39 serving as a solid imaging device through an image forming lens 38 disposed in opposed relationship with the eyepiece 37. A mosaic color filter 41 is mounted on the imaging surface of the CCD 39 to separate colors for, for example, each picture element.

The signal produced from the CCD 39 is read out by the application of a driving signal by a driving circuit 42 incorporated in the CCU 26, and is input to a false color preventing circuit 43 where false color caused by the light having a high intensity is cancelled, and the resultant signal is output to the color monitor 27 as a color TV signal so that it can be displayed in color.

Figure 7:
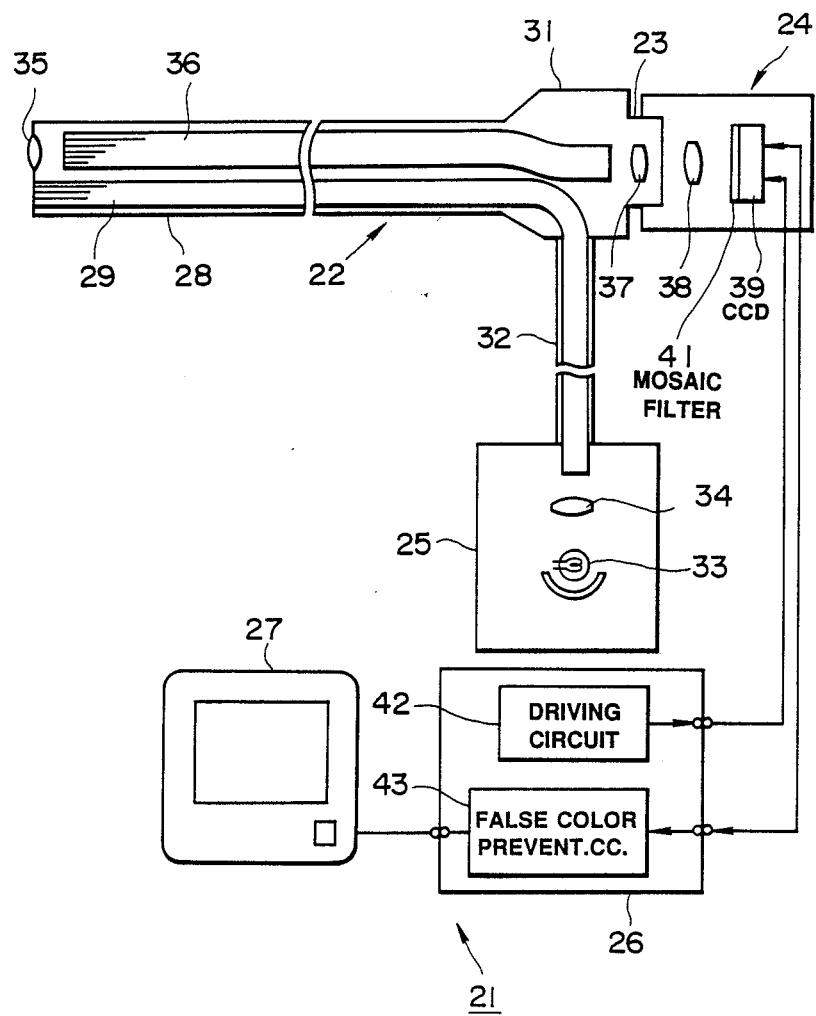
FIG. 7 shows the structure of an endoscope incorporating the first embodiment.

Turning to FIG. 6, the structure of the false color preventing circuit 43 will be described below.

The original signal output from the CCD 39 is amplified by an amplifier 44, and the amplified original signal a is input to both of a low-pass filter 45 and a color separation circuit 46. A luminance signal Y produced by the low-pass filter 45 is input through a delay element 40 to a modulator 47 while color difference signals R-Y and B-Y produced by the color separation circuit 46 are directly input to the modulator 47 which produces a chroma signal C.

Further, the original signal a which has been amplified by the amplifier 44 is input to first, second, ... nth delay elements 49a, 49b, ..., 49n that form a suppressing signal generating portion 48. The outputs of these delay elements 49i (i=a, b, ... ) are input to a comparison circuit 5 where they are compared with each other to generate an inclusive or signal as a suppressing signal s. A resultant suppressing signal s is applied to a suppression control terminal of a suppressing circuit 52 that suppresses the chroma signal C input thereto. A chroma signal C', which is produced from the chroma signal C by the suppressing circuit 52 by suppressing the saturation component of the chroma signal C, is input to an adder 53 where it is added to a luminance signal which has been passed through a low-pass filter 54 and a delay element 40' to generate a composite color picture signal C". The signal C" is then output to the color monitor 27 through a buffer 55.

Figure 8:
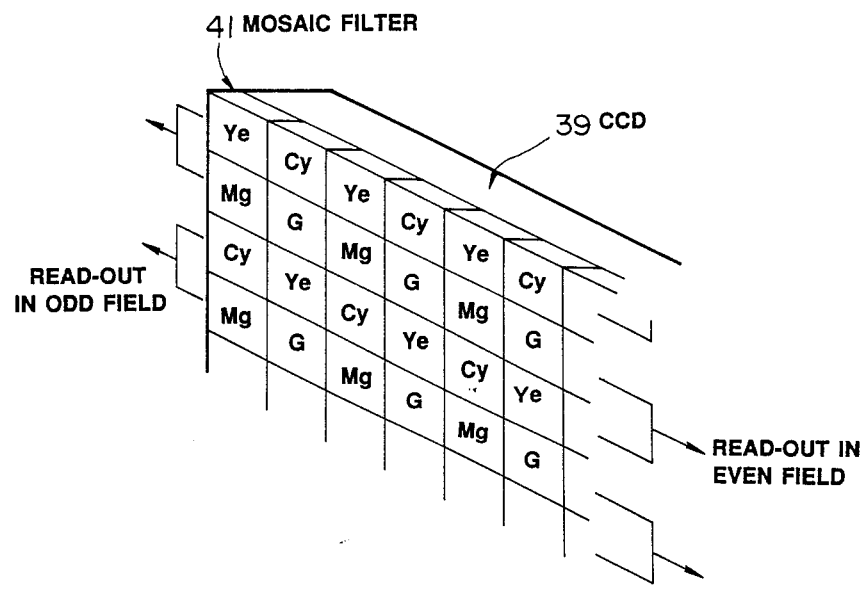
FIG. 8 is a perspective view of a mosaic color filter, showing the arrangement of the color filters.

In the mosaic color filter 41 employed in the CCD 39, color filters may be arranged in the manner shown in FIG. 8. In that case, picture elements in an odd line and those in an even line, i.e., the picture elements in (2m−1)th line and those in 2mth line, are read out together from the CCD 39 in an odd field. For example, if m=1, Ye+Mg, Cy+G, ... are sequentially read out in that order. If m=2, Cy+Mg, Ye+G, ... are read out in that order. On the other hand, in an even field, the picture elements in an even line and those in an odd line are read out together from the CCD 39.

Figure 9:
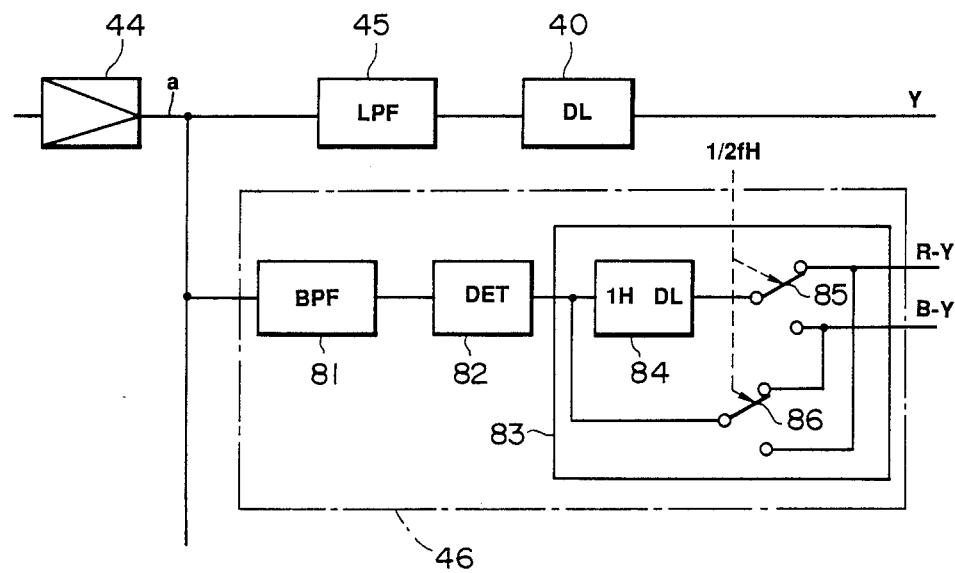
FIG. 9 is a block diagram of a color separation circuit.

The color separation circuit 46 which separates the color component from the signal produced by the CCD 39 will be next described with reference to FIG. 9.

The output signal a of the CCD 39 which has passed through the amplifier 44 is passed through a band-pass filter 81 having a narrow transmission band of, for example, 3.58 MHz±0.5 MHz, and the resultant signal is input to a detection circuit 82 to produce line-sequential color difference signals R-Y and B-Y (2B-G, 2R-G in this case). These color difference signals are then applied to a coincidence circuit 83 where they are combined with each other. The coincidence circuit 83 includes a delay element 84 which delays a signal by 1H (which means 1 horizontal period), and switches 85 and 86 which are switched over by a ½ fH switch-over signal (a signal having a frequency of ½ H). The color difference signals R-Y and B-Y are combined with each other by being passed through these switches 85 and 86. The luminance signal Y which has passed through the delay element 40 and the color difference signals R-Y and B-Y (2B-G and 2R-G in this case) are together applied to the modulator 47 where they modulate a color subcarrier SC having a phase corresponding to 2B-G and 2R-G on the color coordinate to produce the chroma signal C.

The luminance signal Y is not delayed much when it passes through the low-pass filter 45 of a wide transmission band. On the other hand, since the band-pass filter 81 for separating the color information has a narrow transmission band, the color difference signals R-Y and B-Y are delayed more than the luminance signal Y.

In other words, the luminance signal Y and the color difference signals R-Y and B-Y are shifted from each other in terms of time.

Accordingly, the delay element 40 delays the luminance signal Y so that it coincides with the color difference signals R-Y and B-Y. These luminance signal and color difference signals are therefore supplied to the modulator at the same timing so as to generate the chroma signal C.

Since the intensities of the incident light at which Ye, Cy, Mg and G are respectively saturated differ, when the color intensity is high, a false color occurs. In order to eliminate the occurrence of the false color, the suppressing signal generating portion 48 is incorporated in the false color prevention circuit 43.

The output signals of the delay elements 49a, 49b, ... 49n are input to the comparison circuit 51. This comparison circuit 51 may be constructed in the manner shown in FIG. 10.

The comparison circuit 51 consists of a plurality of comparators C1, C2, ..., C3 to the inverted input terminals of which the output signals of the 1st, 2nd, ..., nth delay elements 49a, 49b, ..., 49n are respectively applied, and an OR circuit 50 to which the outputs of the comparators C1, C2, ..., Cn are supplied. A reference voltage Vs is applied to the non-inverted input terminals of the comparators. If the delay time required for a chroma signal C is generated from the original signal a is small, the original signal a is passed through a comparator C0, as shown by the broken line in FIG. 10.

The reference voltage Vs is set to a value corresponding to the lowest saturated level of a color in the color filters used in the mosaic filter 41.

The comparison circuit 51 produces, from the signals input thereto from the 1st, 2nd, ... nth delay elements 49a, 49b, ..., 49n, a suppressing signal s which assumes a high level for a period of time longer than that in which false color is occurring.

The resultant suppressing signal s is applied to the control terminal of the suppressing circuit 52 constituted by, for example, an analogue switch, so that it turns on a terminal Ta and cancels the saturation component of the chroma signal C.

An AGC circuit may also be used in place of the analog switch.

The delay elements 40 and 40', which delay signals by the same time, may be eliminated.

Next, how the suppressing signal s is generated by the suppressing signal generating portion 48 from the output signals of the delay elements 49a, 49b, ... 49n will be described with reference to FIG. 11.

In this embodiment, assuming that the time required for the original signal a that has passed through the amplifier 44, such as the one shown in FIG. 11a, to pass through the low-pass filter 46, the color separation circuit 47 and the modulator 48 to generate the chroma signal C shown in FIG. 11b is t, the first delay element 49a delays a signal by a delay time $t_{DL1}$ which is slightly shorter than the delay time t by, for example, Δt $(t > t_{DL1})$.

The second delay element 49b delays a signal by the time $t_{DL2}$ which is slightly longer than $t_{DL1}$ by, for example, by ΔT, as shown in FIG. 11d $(t_{DL1} < t_{DL2})$.

The (i+1)th delay element (i+1=b, c, ..., n) delays a signal by a time longer than the delay time $t_{DLi}$ of the ith delay element 49i by ΔT. FIG. 11e shows a signal which has passed through the nth delay element 49n. The output signals of the 1st, 2nd, ..., nth delay elements 49a, 49b, ..., 49n are input to the comparison circuit 51 which produces an inclusive or signal of these input signals as the suppressing signal s shown in FIG. 11f. The number of delay elements 49i and the width ΔT are set such that the suppressing signal s has time margins of Δt and t3 at the front and rear edges, respectively.

As stated above, if the delay time t required for the original signal a to be processed to generate the chroma signal C therefrom is sufficiently small, the original signal a may be directly input to the comparison circuit 51 without being passed through the delay element.

In this embodiment, the signals which have been delayed by different times by the delay elements 49a, 49b, ... 49n are combined to form a suppressing signal s. In consequence, the suppressing signal has no recessed portion. Further, such a suppressing signal is used to cancel the saturation component of the chroma signal C in which false color is generated due to the high intensity of incident light. Occurrence of false color can be therefore effectively prevented.

Further, since the delay time $t_{DL1}$ of the first delay element 49a is set to a value slightly shorter than the delay time t it takes for the original signal to be processed to generate the chroma signal C, the normally colored portion of the chroma signal C is not unnecessarily cancelled.

Thus, since generation of the false signal can be suppressed, color reproduction can be improved. This makes the image displayed on the color monitor 27 an appropriate one to be used for diagnosis with an endoscope.

Figure 12:
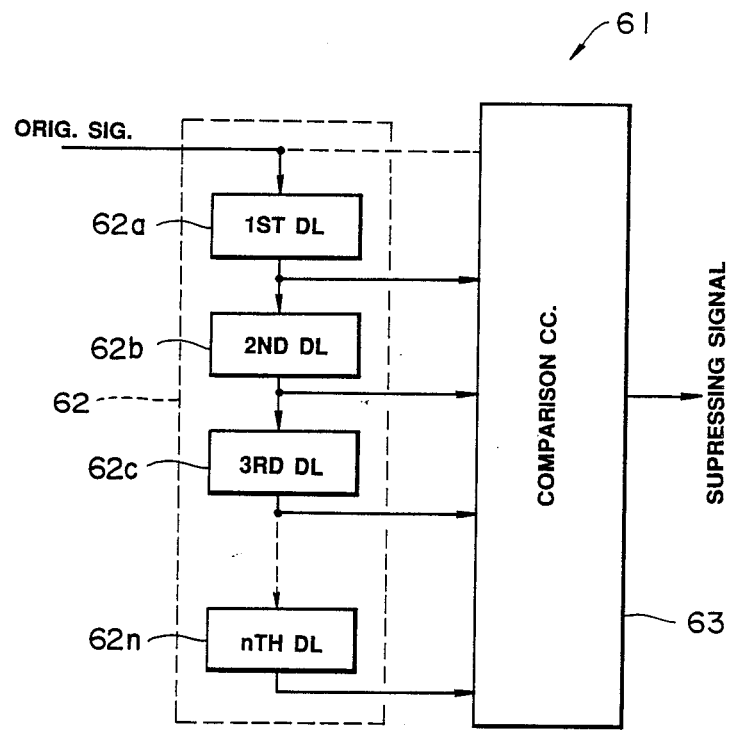
FIG. 12 is a block diagram of a suppressing signal generating circuit, showing a second embodiment of the present invention.
Figure 13:
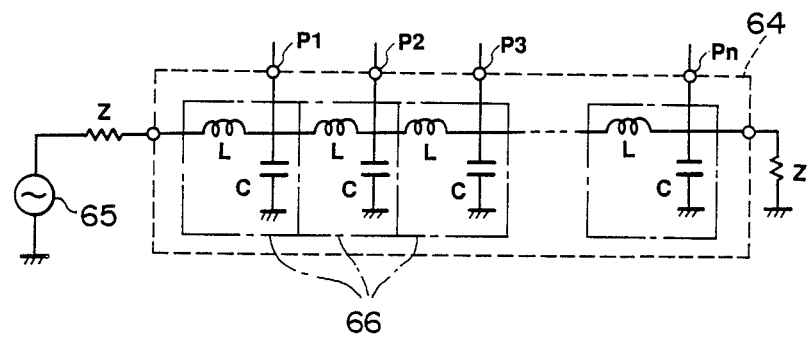
FIG. 13 is a circuit diagram of a delay line with taps that forms the delayed signal generating portion of FIG. 12.

FIG. 12 shows an equivalent circuit of a suppressing signal generating portion 61, showing a second embodiment of the present invention, and FIG. 13 shows the practical structure of series-connected delay elements incorporated in the suppressing signal generating portion 61.

In this second embodiment, the original signal a is input to a first delay element 62a that forms a delayed signal generating portion 62, and the output signal of the first delay element 62a is then input to both of a comparison circuit 63 and a second delay element 62b. The output signal of the second delay element 62b is input to both of the comparison circuit 63 and a third delay element 62c. The output signal of an nth delay element 62n is input to the comparison circuit 63.

On receipt of these delayed signals, the comparison circuit 63 compares the levels of these signals, and produces an inclusive or signal of these signals having a high level as a suppressing signal.

The 1st, 2nd, 3rd, ..., nth delay elements 62a, 62b, 62c, ..., 62n are connected with each other in series to form the delayed signal generating portion 62. This allows a delay line 64 with taps to form the delayed signal generating portion 62, as shown in FIG. 13.

The delay line 64 with the taps has an input impedance equivalent to an output impedance Z of the original signal represented by a signal source 65. Each of delay units 66 is represented by an inductance L and an equivalent capacitor C, and is provided with a tap P1, P2, P3, ... or Pa. The output terminal of the delay line 64 is grounded through a resistor Z and is matched. The taps P1, P2, P3, ..., Pn are connected to the input terminal of the comparison circuit 63, thereby forming the delayed signal generating portion 62 shown in FIG. 12. If the delay time provided by the signal processing system for generating the chroma signal is short, the original signal is directly input to the comparison circuit 63 in this embodiment, as shown by the broken line in FIG. 12, as in the first embodiment.

In the second embodiment, the plurality of delay elements 62a, 62b, 62c, ..., 62n required to generate a suppressing signal can be formed by one delay line 64 with the taps.

In any of the above-described embodiments, the delay elements may be provided in any number which is 3 or above. More specifically, the two delay elements generate two delayed signals that respectively cover the front and rear edges of a color signal, and a third delay element generates a delayed signal that covers the interval between these two delayed signals so that a suppressing signal generated has no recesses.

Further, a plurality of delay elements may be incorporated as the third delay element, if necessary.

FIG. 14 shows a suppressing signal generating portion 71, showing a third embodiment of the present invention.

In the third embodiment, a suppressing signal having a variable width can be generated.

In this embodiment, series-connected delay elements 72a, 72b, 73c, 73d, 73e, ... are formed by a delay line with taps. The taps P2, P3, P4, for example, are connected to the input terminals of a comparison circuit 73. The delayed signals output from the taps P2 and P4 respectively form delayed signals c and d which respectively cover the front and rear edges of a chroma signal b generated from an original signal, as shown in FIGS. 15. Further, the delayed signal e output from the tap P3 forms a signal which is delayed so that it covers the interval between the two delayed signals c and d.

In this embodiment, taps P1 and P5 are connected to the input terminals of the comparison circuit 73 through analog switches SW1 and SW2, respectively. These analog switches SW1 and SW3 can be turned on and off by a selection switch such as a DIP switch or a switch switch-over signal which is generated through a decoder 74 (provision of the decoder 74 may be eliminated in some cases) by operating keys.

For example, the time margins of the suppressing signal can be varied in accordance with the delayed time of the chroma signal generated by the color signal generating means by controlling ON/OFF of the analog switches SW1 and SW2, or occurrence of false signal can be prevented in accordance with the environment in which the false color occurs by controlling ON/OFF of the analog switches SW1 and SW2 (unnecessary normal color signal is not suppressed).

It may also be arranged such that the delayed signal output from the tap P3 can be turned on or off in place of the analog switches SW1 and SW2.

Further, the original signal which has passed through the amplifier may also be passed through a low-pass filter before it is input to a plurality of delay elements.

Figure 16:
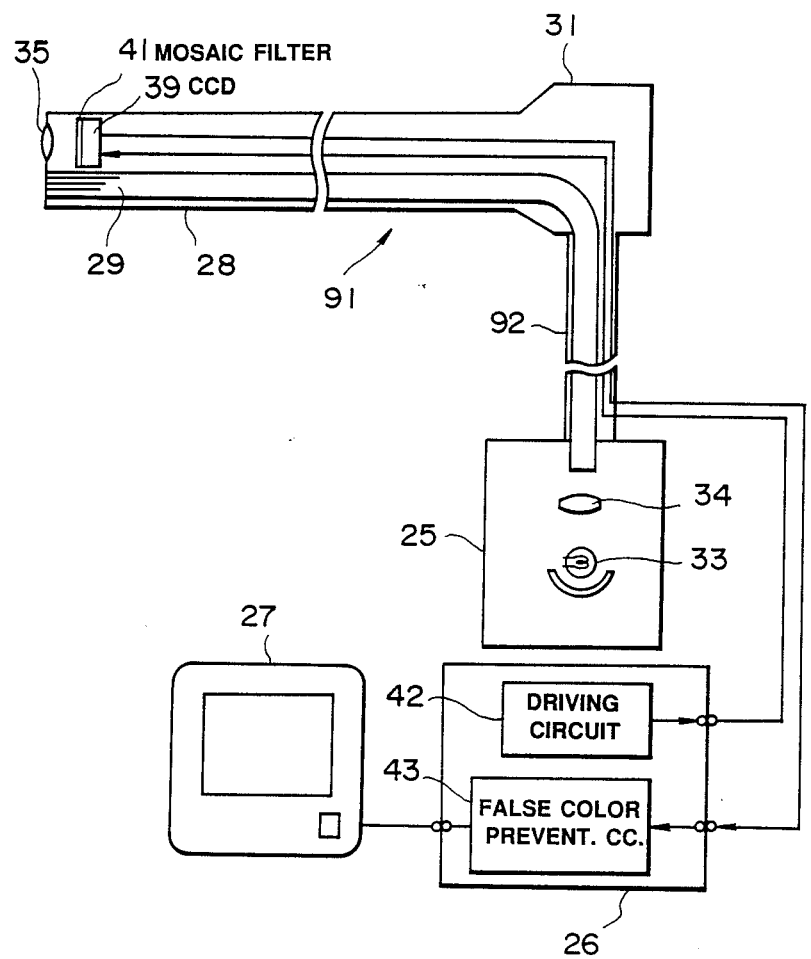
FIG. 16 is a schematic view of an electronic endoscope which incorporates an electronic scope as an imaging means.
Figure 17:
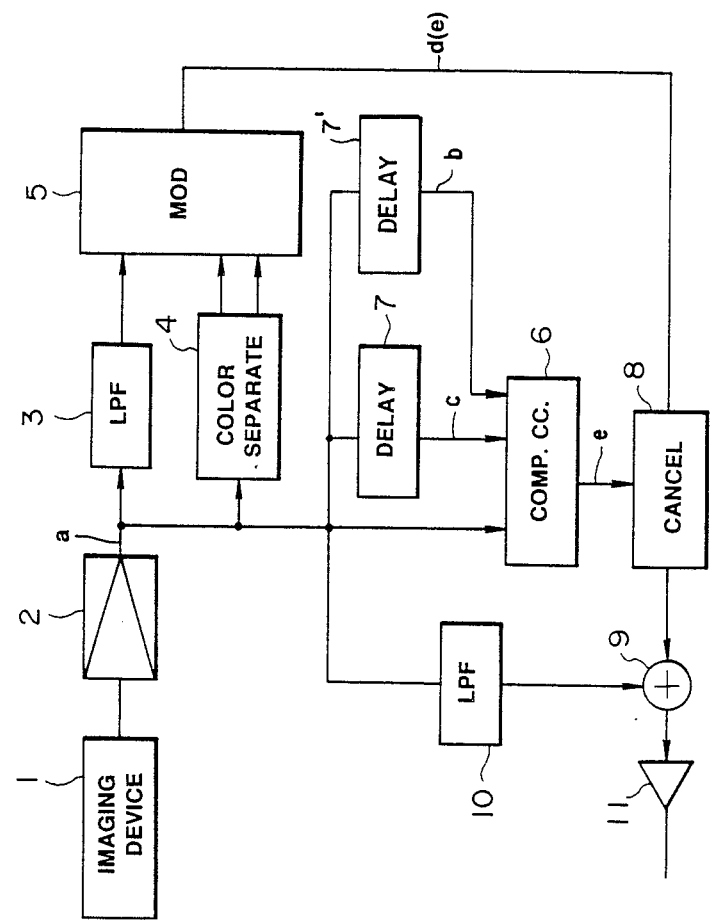
FIG. 17 is a schematic view of another conventional false color preventing circuit.

The endoscope shown in FIG. 7 incorporates the TV camera 24 as a color imaging means. However, the arrangement of the endoscope is not limited to this, and it may be formed as an electronic endoscope 91 shown in FIG. 16.

In this electronic endoscope 91, the CCD 39 with the mosaic color filter 41 mounted thereon is disposed at a focal point of the objective lens 35. The CCD 39 is connected to the CCU 26 through a signal cable that passes through the inserted portion 29 and a universal code 92.

Since the electronic endoscope 91 does not incorporate the image guide 36, it has no eyepiece portion 23. Other structure of the electronic endoscope 91 is the same as that of the fiberscope 22 shown in FIG. 7, the same components being designated by the same reference numerals.

As will be understood from the foregoing description, in the present invention, a color suppressing signal generating means includes means for generating a delayed signal that covers the front and rear edges of a chroma signal generated from an original signal, and means for generating a delayed signal that covers the interval between these edges. This allows false color generated due to the high intensity of incident light to be reliably prevented.

What is claimed is:

1. A false color preventing circuit for generating a standard color video signal from a color picture signal output from an imaging device with a plurality of color filters provided therein, said color filters being saturated at different intensities of light, said false color preventing circuit comprising:

signal generating means for generating, from said color picture signal, a luminance signal having a wide bandwidth and a color signal having a narrow bandwidth;

first and second delay means for generating first and second delayed signals that respectively cover front and rear edges of said color signal be delaying said luminance signal;

third delay means for generating at least a third delayed signal which has been delayed in time more than said first delayed signal generated by said first delay means and delayed less in time than said second delayed signal generated by said second delay means wherein said third delayed signal covers an interval between said first and second delayed signals;

suppressing signal generating means for generating a suppressing signal using said first, second and third delayed signals;

color signal suppressing means for suppressing said color signal by said suppressing signal; and mixing means for generating said standard color video signal by mixing said color signal which has been suppressed by said color signal suppressing means with said luminance signal.

2. A false color preventing circuit according to claim 1, wherein said first, second and third delay means are formed by a delay line with a plurality of taps corresponding to the different delay times.

3. A false color preventing circuit according to either claims 1 or 2, wherein at least one delay time of said first, second and third delay means is made variable, said at least one delay time being varied by a switchover means.

4. A false color preventing circuit according to either claims 1, or 2, wherein said mixing means generates a composite color video signal.

5. A false color preventing circuit comprising:

an imaging device with a plurality of color filters mounted on an imaging surface thereof for color separation, said color filters being saturated at different intensity levels, said imaging device being capable of photoelectric conversion;

a driving circuit for applying a driving signal to said imaging device;

signal generating means for generating a luminance signal and a color signal from a color picture signal output from said imaging device by application of said driving signal;

first and second delay means for generating first and second delayed signals that respectively cover front and rear edges of said color signal by delaying said luminance signal;

third delay means for generating at least a third delayed signal which has been delayed in time more than said first delayed signal generated by said first delay means and delayed less in time than said second delayed signal generated by said second delay means wherein said third delayed signal covers an interval between said first and second delayed signals;

suppressing signal generating means for generating a suppressing signal using said first, second and third delayed signals;

color signal suppressing means for suppressing said color signal by said suppressing signal; and mixing means for generating a standard color video signal by mixing said color signal which has been suppressed by said color signal suppressing means with said luminance signal.

6. A false color preventing circuit according to claim 5, wherein said imaging device is accommodated in a TV camera.

7. A false color preventing circuit according to claim 5, wherein a TV camera can be mounted on an eyepiece portion of a fiberscope having an elongated inserted portion.

8. A false color preventing circuit according to claim 5, wherein said imaging device is disposed at a forward end of an elongated inserted portion of an electronic scope.

* * * * *